United States Patent [19]

Smith

[11] Patent Number: 5,181,683
[45] Date of Patent: Jan. 26, 1993

[54] REMOVABLE HANGER

[76] Inventor: Harold C. Smith, 1101 Birchcrest Rd., Bellevue, Nebr. 68005

[21] Appl. No.: 850,466

[22] Filed: Mar. 11, 1992

[51] Int. Cl.⁵ .............................................. A47K 1/00
[52] U.S. Cl. .................................. 248/227; 248/237; 248/304; 248/339
[58] Field of Search ............... 248/237, 227, 301, 304, 248/339, 340, 48.2, 48.1, 322

[56]         References Cited
         U.S. PATENT DOCUMENTS

| D. 279,450 | 7/1985  | Chap ..................................... D8/363 |
| D. 300,302 | 3/1989  | Possemato ........................... D8/367 |
| 1,036,945  | 8/1912  | Wilkerson ............................ 248/237 |
| 1,333,692  | 3/1920  | Wester . |
| 2,625,353  | 1/1953  | Henry ............................. 248/237 X |
| 3,260,489  | 7/1966  | Hentzi ................................. 248/215 |
| 3,854,689  | 12/1974 | Engels ................................. 248/340 |
| 5,094,417  | 3/1992  | Creed ............................. 248/339 X |

Primary Examiner—Ramon O. Ramirez
Attorney, Agent, or Firm—Zarley, McKee, Thomte, Voorhees & Sease

[57]              ABSTRACT

A hanger designed for removable engagement with a roof gutter includes a rigid body with a hook-shaped upper end adapted for attachment to the gutter lip, and a lower end having an eyebolt or the like to which a bird feeder may be attached. The lower portion of the hanger has a rearward edge which projects rearwardly farther than the rearward edge of the hook portion of the hanger, such that the lower rearward edge will contact the fascia board of the roof when the hook portion is connected to the gutter lip.

8 Claims, 3 Drawing Sheets

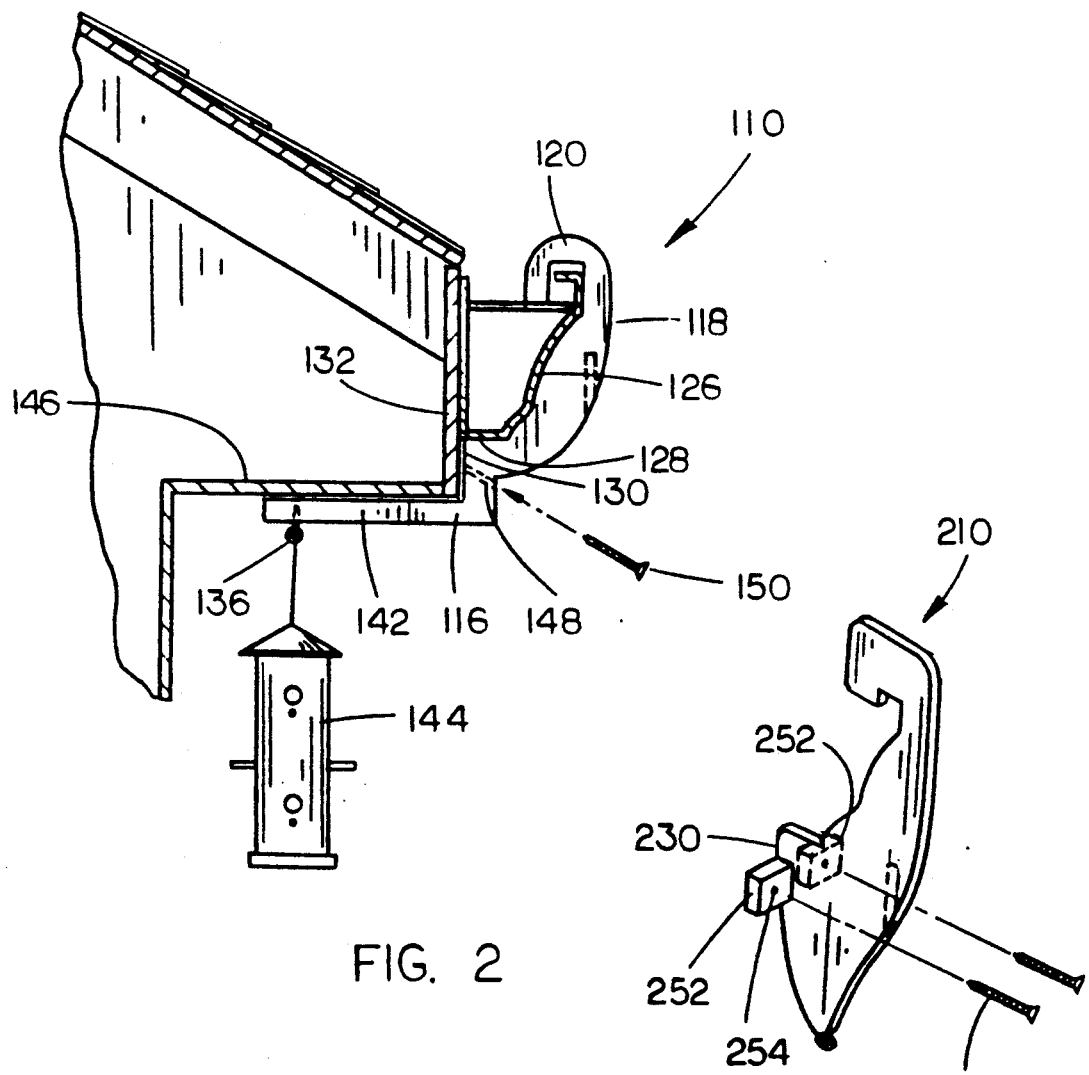
FIG. 2
FIG. 3
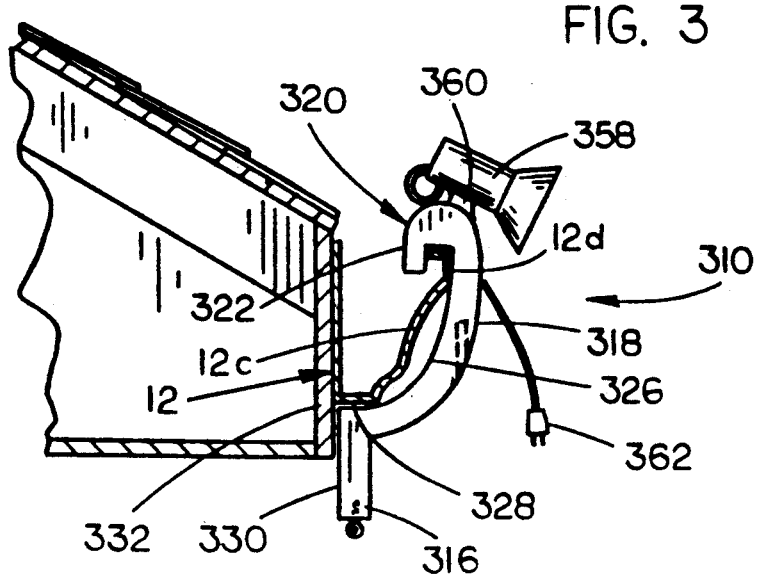
FIG. 4

REMOVABLE HANGER

TECHNICAL FIELD

The present invention relates generally to removable or detachable hooks and hangers, and more particularly to an improved removable hook which may be detachably mounted on the gutter or eaves of a home.

BACKGROUND OF THE INVENTION

Bird watching has become a very popular pastime in recent years, thereby sparking a renewed interest in bird feeders and other related items. It is therefore desirable to look at a bird feeder near the window of a house so that the birds may be easily viewed.

Typically, a bird feeder is suspended from a wire which is attached to an eyebolt or hook fastened directly into the soffit of the overhanging roof. While the location of the bird feeder is highly desirable, the conventional methods for fastening the feeder to the house have several drawbacks. Typically, it is difficult to reposition the feeder, since the eyebolt must be removed from the soffit and fastened in a different position. In most cases, this requires the use of a tall ladder, and a number of tools to drill a hole and fasten the eyebolt. This also leaves holes in the soffit, when the eyebolt is removed.

Another problem with conventional methods for fastening a bird feeder to a soffit, is in the accessibility of the bird feeder. Again, a tall ladder is typically necessary to reach the lid of the feeder in order to refill the bird feeder.

Finally, it is not typically a simple task to remove the feeder when desired, for replacement or repair.

It is therefore a general object of the present invention to provide an improved removable hanger for bird feeders.

Yet another object is to provide a removable hanger which may be detachably connected to the gutter of a home.

Still another object of the present invention is to provide a removable hanger which may be simply removed while standing on the ground, without requiring a ladder or other support.

A further object is to provide a removable hanger which may be securely attached to the structure of the house when desired.

Yet another object of the present invention is to provide a removable hanger which will provide a base for a wide variety of products which may be connected to the gutter of a house.

These and other objects of the present invention will be apparent to those skilled in the art.

SUMMARY OF THE INVENTION

The hanger of the present invention is designed for removable engagement with a roof gutter to support a bird feeder or the like. The hanger includes a rigid body with a hook-shaped upper end adapted for attachment to the gutter lip, and a lower end having an eyebolt or the like to which a bird feeder may be attached. The lower portion of the hanger has a rearward edge which projects rearwardly farther than the rearward edge of the hook portion of the hanger, such that the lower rearward edge will contact the fascia board of the roof when the hook portion is connected to the gutter lip. A projecting pin may be provided in the lower rearward edge to embed in the fascia board and provide further support and stability for the hanger.

BRIEF DESCRIPTION OF THE DRAWINGS

FIG. 2 is a side elevational view of a second embodiment of the invention, connected to a house;

FIG. 3 is a side elevational view of a third embodiment of the invention connected to a house;

FIG. 4 is perspective view of a fourth embodiment of the invention;

DESCRIPTION OF THE PREFERRED EMBODIMENTS

Figure 1:
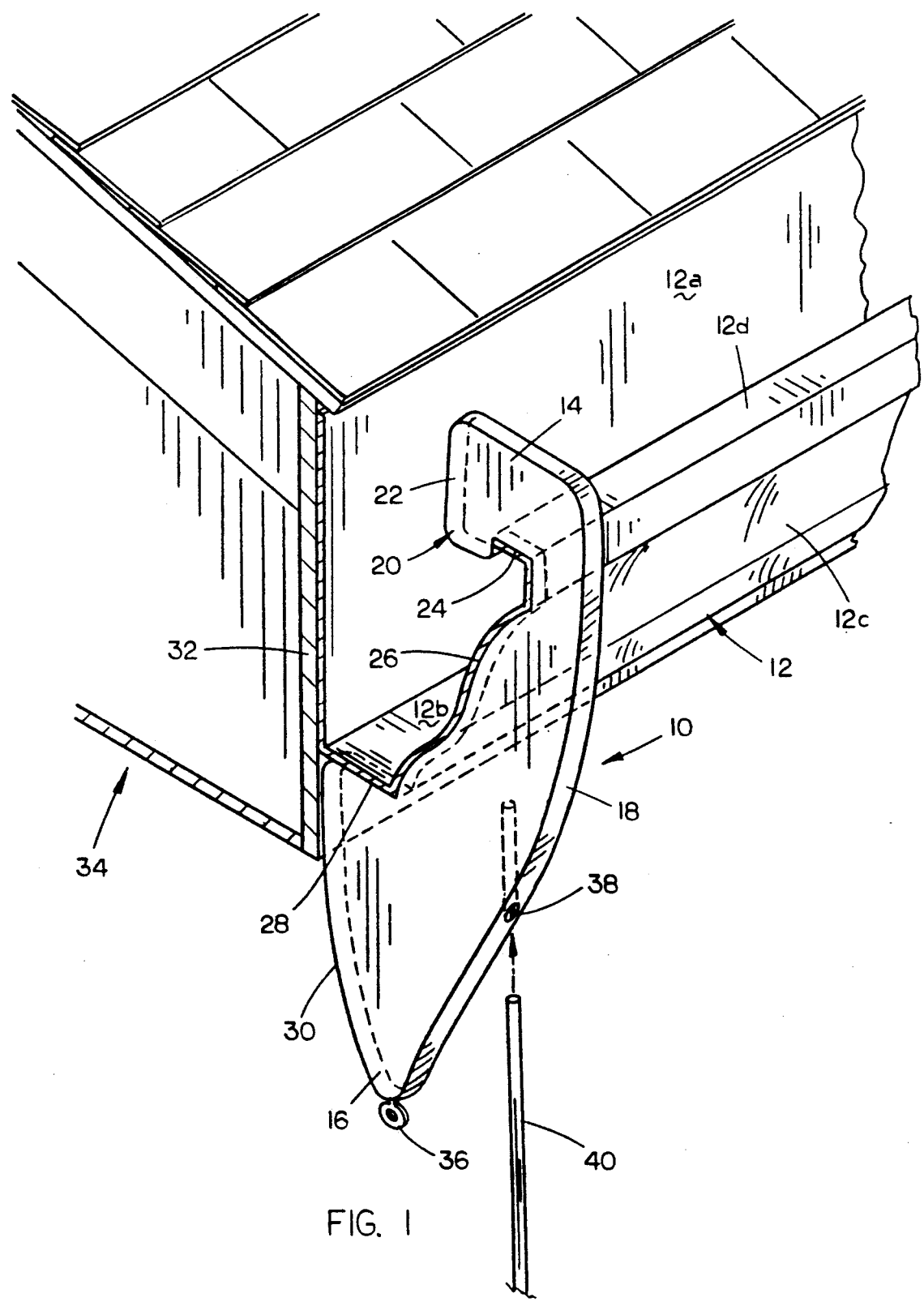
FIG. 1 is an enlarged perspective view of the hanger of the present invention installed on the gutter of a house.

Referring now to the drawings, in which similar or corresponding parts are identified with the same reference numeral, and more particularly to FIG. 1, the removable hanger of the present invention is designated generally at 10, and is preferably constructed of a rigid material such as wood or the like. Hanger 10 is designed for detachable connection to a conventional gutter 12 mounted on the fascia 32 of a house 34. Gutter 12 includes a rearward panel 12a, a bottom panel 12b, a forward curvilinear panel 12c and a gutter lip 12d extending along the upper edge of forward panel 12c.

Hanger 10 includes an upper end 14, a lower end 16, and a forward edge 18 extending from upper end 14 to lower end 16. Upper end 14 extends rearwardly and then downwardly from the upper end of forward edge 18 to form a hook-shaped portion 20 having a rearward edge 22 and a bottom edge 24. As shown in FIG. 1, hook portion 20 is shaped to receive the gutter lip 12d along bottom edge 24.

Hanger 10 includes an intermediate rearward edge 26 which extends downwardly from bottom edge 24 of hook portion 20, to a generally horizontal ledge 28. Ledge 28 extends rearwardly from intermediate rearward edge 26 to a lower rearward edge 30, which proceeds downward to lower end 16 of hanger 10. As shown in FIG. 1, intermediate rearward edge 26 is cut to follow the form of front panel 12c, and ledge 28 is located to abut against bottom panel 12b of gutter 12. Ledge 28 extends rearwardly a distance such that the upper end of lower rearward edge 30 is in abutting contact with the front surface of fascia board 32.

An eyebolt 36 is mounted in the lower end 16 of hanger 10 so as to receive a hook, wire, or other means of support for a bird feeder or other object. A vertically oriented aperture 38 extends upwardly into a lower portion of forward edge 18, to receive the upper end of a rod 40, as shown in FIG. 1. Rod 40 may be removably inserted within aperture 38 to permit a person on the ground to detach hanger 10 from gutter 12. This is accomplished by inserting rod 40 into aperture 38, moving the lower end 16 of hanger 10 forwardly so as to pivot hanger 10 on hook portion 20. Once ledge 28 is forward of the bottom panel 12b of gutter 12, hanger 10 may be lifted so as to release hook portion 20 from gutter lip 12d. This process may be reversed so as to attach hanger 10 to gutter 12. Referring now to FIG. 2, a second embodiment of the hanger is identified generally at 110 and includes a hook portion 120, lower end 116, forward edge 118, ledge 128, and intermediate and lower rearward edges 126 and 130, similar to the first embodiment of hanger 10. Hanger 110 further includes a rearwardly extending cantilevered arm 142, which is fastened to lower end 116 and extends rearwardly therefrom. Eyebolt 136 may then be fastened along arm 142 at any desired position, so as to hang a bird feeder 144 at any desired position under soffit 146. Because the weight of a bird feeder positioned at the extreme rearward end of arm 142 could cause lower end 116 of hanger 110 to swing outwardly from fascia board 132, an aperture 148 is provided in lower end 116 for receiving a screw 150 or the like. Aperture 148 extends from forward edge 118 to lower rearward edge 130 so as to permit the fastening of screw 150 into fascia board 132.

Referring now to FIG. 3, a third embodiment of the invention is designated generally at 210, and is essentially identical to hanger 10 except for the provision of a pair of projecting support arms 252. Each support arm 252 is mounted adjacent the upper end of the lower rearward edge 230, and flush therewith. An aperture 254 extending through each support arm 252 will receive a screw 256 or the like. Support arms 252 are located so as to be in flush contact with the fascia board, so that screws 256 may be fastened into the fascia to further fasten hanger 210 to the house.

Referring now to FIG. 4, a fourth embodiment of the invention is designated generally at 310. Hanger 310 includes the same hook portion 320, forward edge 318, lower end 316 and ledge 328 as the first embodiment of hanger 10. The main difference between embodiment 310 and hanger 10 is in the shape of intermediate rearward edge 326 and lower rearward edge 330. As shown in the drawings, intermediate rearward edge 326 need not follow the shape of the forward panel 12c of gutter 12, to effectively be secured to gutter 12. Rather, lower rearward edge 330 must be located so as to abut fascia board 332 below gutter 12. Thus, hook portion 320 acts as a fulcrum about gutter lip 12d whereby lower rearward edge 330 is pivoted into contact with lascia board 332. To create this relationship, lower rearward edge 330 must be located rearwardly of the rearward edge 322 of hook portion 320.

In addition, embodiment 310 discloses yet another possible attachment to hanger 310, which may be removably secured to gutter 12. More specifically, an electric lamp 358 has an adjustable base 360 mounted on the upper end of hanger 310. An electrical cord 362 extends from lamp 358 to electrically connect the lamp to a power source. In this fashion, hanger 310 permits the selective location of lamp 358 along gutter 12 to any desired location.

Figure 5:
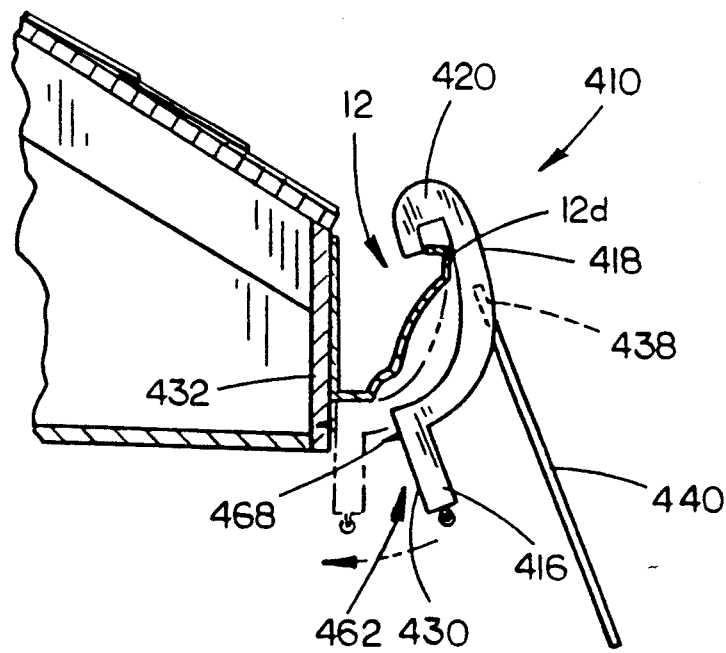
FIG. 5 is a side elevational view of a fifth embodiment of the invention.
Figure 6:
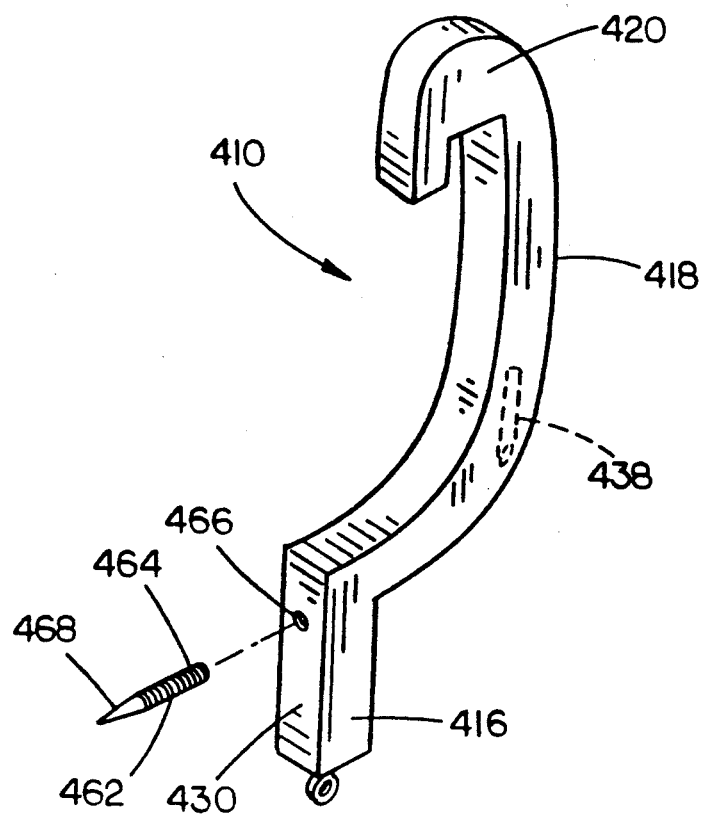
FIG. 6 is a perspective view of the fifth embodiment.

Referring now to FIGS. 5 and 6, a fifth embodiment of the invention is designated generally at 410. Hanger 410 includes all of the same features as the fourth embodiment 310, including a hook portion 420, forward edge 418, lower end 416, lower rearward edge 430, and aperture 438. Fifth embodiment 410 differs in the use of a projecting pin 462 mounted in lower rearward edge 430. Pin 462 has a threaded end 464 which is threaded into an aperture 466 in lower rearward surface 430, as shown in FIG. 6. Pin 462 also has a pointed opposing end 468 which projects rearwardly from lower rearward edge 430, as shown in FIG. 5.

When hanger 410 is hooked on gutter 12, hook portion 420 is pivoted on gutter lip 12d such that pin 462 is embedded into fascia 432, as shown in broken lines. This pivoting action is effected utilizing rod 440 inserted in aperture 438. It can be seen that pin 462 will provide additional supporting strength, as well as stability against movement of hanger 410, when embedded in fascia board 432. Hanger 410 may be quickly and easily removed by pivoting the hanger rearwardly to disengage pin 462 from fascia board 432, and then removing hook portion 420 from gutter lip 12d.

Whereas the invention has been shown and described in connection with the preferred embodiments thereof, it will be understood that many modifications, substitutions and additions may be made which are within the intended broad scope of the appended claims. For example, a hanging plant or other hanging accessory may be attached to the hanger at any one of various locations. Other accessories which may be utilized with the hanger would include cameras, motion detectors, wind operated ornaments, and many other possibilities.

Thus, there has been shown and described an improved removable hanger which accomplishes at least all of the above stated objects.

I claim:

1. A hanger for removable engagement With a roof gutter, the roof gutter mounted on a fascia board on a roof, and of the type including a rearward panel, a bottom panel, and a forward panel with an upper lip, comprising:

a rigid body having an upper end, lower end and forward edge;

said upper end including a rearwardly extending hook portion having a rearward edge, a bottom edge, and a hook interior surface adapted to receive the gutter upper lip;

said body having an intermediate rearward edge extending downwardly and rearwardly from said hook interior surface to a lower end connected to a lower edge, said intermediate rearward edge extending rearward beyond the hook portion rearward edge; and said body having a lower rearward edge extending vertically downwardly from the lower end of said intermediate lower edge to the lower end of said body;

said lower rearward edge including a portion for abutting the fascia board when the hook portion is connected to the gutter lip.

2. The hanger of claim 1, further comprising attachment means mounted on said body for attaching a bird feeder thereto for suspension under said hanger.

3. The hanger of claim 1, further comprising means mounted on said rigid body for adjustably mounting a flood light.

4. The hanger of claim 1, wherein said forward edge has a portion which extends rearwardly, and a generally vertically oriented aperture is formed in said rearwardly extending portion of said forward edge, said aperture extending only partially into said rigid body for receipt of a rod to lift and remove the hanger from the roof gutter.

5. The hanger of claim 1, further comprising means for supplementary securement to the roof fascia board, including a securement aperture extending from said front edge to said lower rearward edge at said portion for abutting the roof fascia, and a fastener removably secured through said securement aperture to removably secure the hanger to the fascia board.

6. The hanger of claim 5, further comprising an elongated arm secured to the lower end of said hanger and extending rearwardly therefrom rearwardly beyond said fascia board.

7. The hanger of claim 1, wherein said intermediate rearward edge is formed to closely conform with the shape of said gutter front panel.

8. The hanger of claim 1, further comprising a pin means mounted on said portion for abutting the roof fascia, having a rearwardly projecting point adapted to embed in the roof fascia when said hanger is positioned on the roof gutter.

* * * * *